Jan. 4, 1949.   W. J. A. McKAY ET AL   2,457,909
HYDRAULIC CHUCK

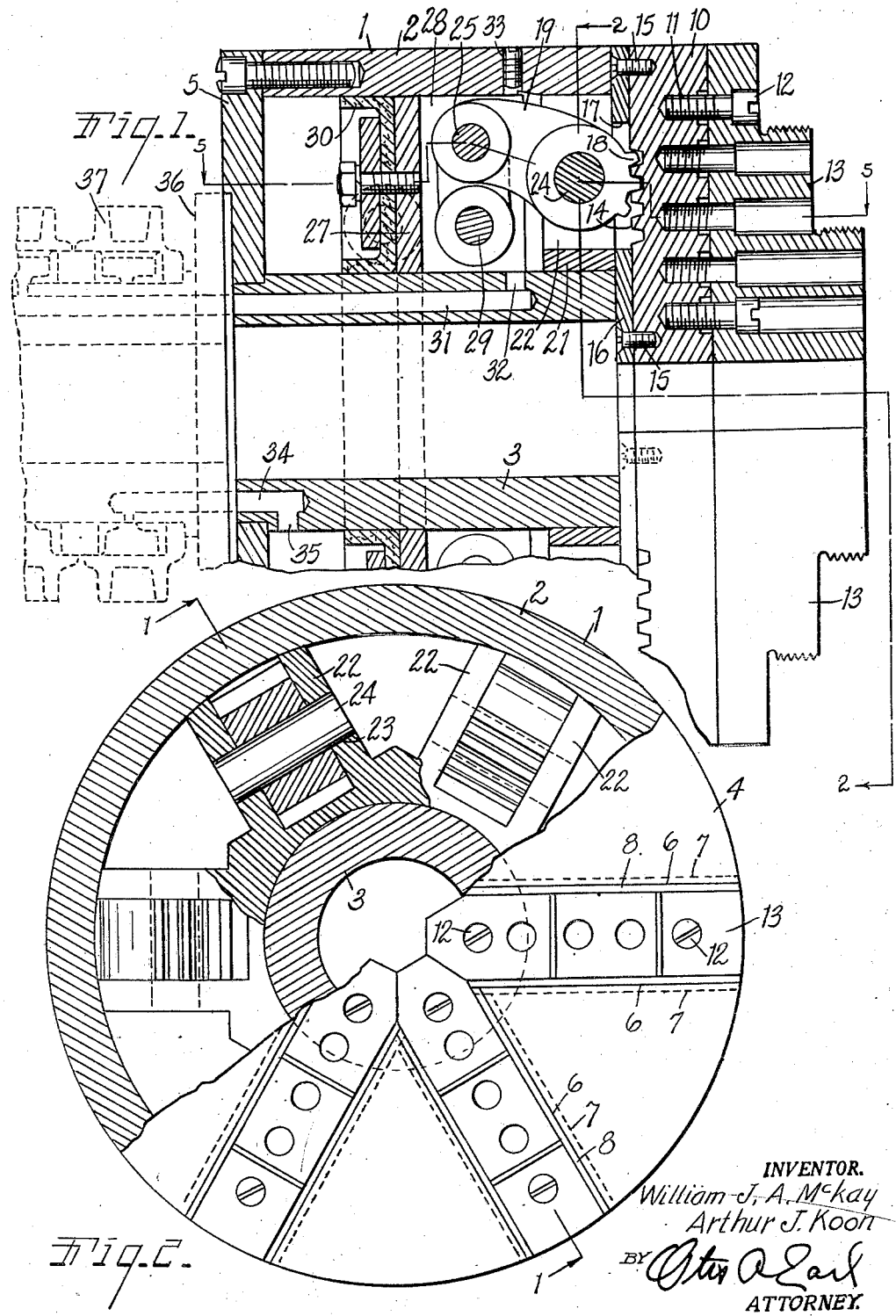

Filed Aug. 15, 1946   2 Sheets-Sheet 2

INVENTOR.
William J. A. McKay
Arthur J. Koon
BY Otis A. Earl
ATTORNEY

Patented Jan. 4, 1949

2,457,909

UNITED STATES PATENT OFFICE 2,457,909

HYDRAULIC CHUCK

William J. A. McKay and Arthur J. Koon, Grand Rapids, Mich.

Application August 15, 1946, Serial No. 690,653

7 Claims. (Cl. 279—4)

1

This invention relates to improvements in hydraulic chuck.

The principal objects of the invention are:

First, to provide a hydraulic chuck in which the jaws and the actuating piston are combined in a single rotatable assembly.

Second, to provide a hydraulic chuck which may be assembled on the head stock of a lathe without requiring an actuating rod extending through the main shaft of the lathe.

Third, to provide a hydraulic chuck cooperable with a lathe having hydraulic pressure connections mounted on the face plate thereof.

Other objects and advantages relating to details and economies of the invention will be apparent from the following description. The invention is further pointed out in the claims.

The drawings of which there are two sheets, illustrate a preferred form of the invention.

Fig. 1 is a fragmentary view partially in cross section taken longitudinally through our chuck along the plane indicated by the line 1—1 in Fig. 2.

Fig. 2 is an end elevational view partially broken away, and shown in cross section, along the broken line 2—2 in Fig. 1 and showing the chuck in closed position.

Figure 3:
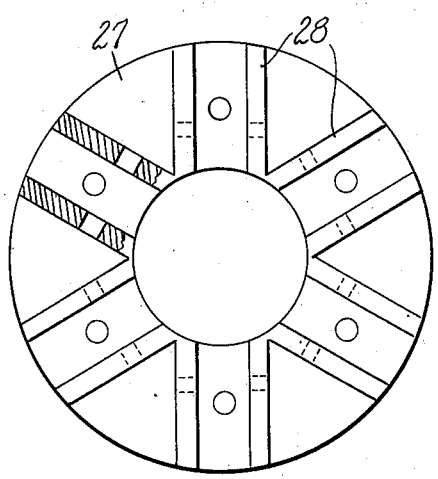
Fig. 3 is an elevational view, partially broken away, of the actuating piston of the chuck.
Figure 4:
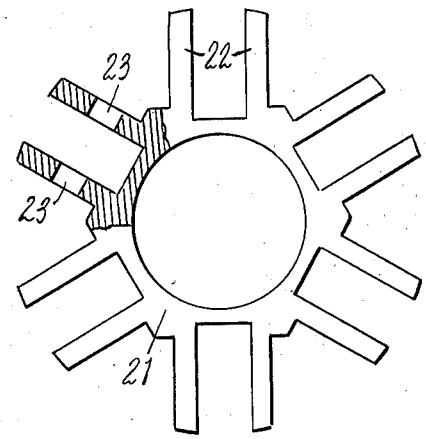
Fig. 4 is an elevational view, partially broken away, of the pinion supporting spider used in the chuck.
Figure 5:
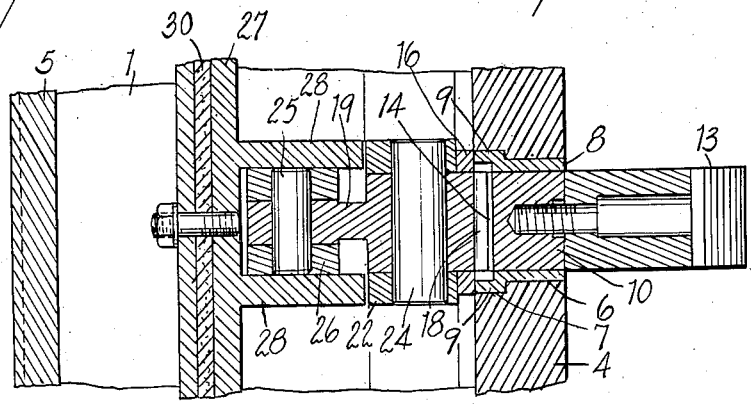
Fig. 5 is a fragmentary cross sectional view taken along the broken line 5—5 in Fig. 1.

In the drawings, the reference character 1 indicates generally the body of the chuck consisting of an outer cylinder 2 which is connected to an inner cylinder 3 by the front plate 4. The rear end of the body is closed by an annular plate 5 positioned around a centering shoulder on the inner cylinder and secured to the outer cylinder by suitable machine screws.

The front plate 4 of the body is cut away in a plurality of radially extending slots 6 which are spaced equi-angularly around the member. The slots 6 are undercut or shouldered on the inner surface of the front plate as indicated at 7.

Positioned within each of the slots 6 is a pair of shoe slide members 8 which are notched to fit in the enlarged portions 7 of the slots and which are provided with an interior notch 9 on the inner face thereof. Positioned between the

2 shoe slides 8 is a jaw slide member 10 which defines a series of equally spaced, tapped holes 11 on the forward face thereof. The holes 11 are arranged to receive the screws 12 for selectively locating the chuck jaws 13 on the forward face of the jaw slides. The rear face of the jaw slides are shaped to have rack teeth 14 formed therein.

Positioned within the body 2 and secured to the inner face of each jaw slide by the metal screws 15, see Fig. 1, are a series of shoe plates 16, each of which defines a central aperture 17, exposing the rack teeth 14 to the interior of the chuck body. Each shoe plate connects its associated pair of shoe slides. The rack teeth 14 are arranged to mesh with the pinion teeth 18 formed on the pinion levers 19.

Secured around the inner cylinder 3 at the forward end thereof, is a pinion carrying spider 21 provided with the radially extending pairs of arms 22, which are apertured at 23 to receive the pinion shafts 24 for supporting the pinion levers 19. The rear ends of the pinion levers 19 are pivotally connected by pins 25 to the links 26.

Positioned within the annular space between the inner and outer cylinders 2 and 3 is an annular piston 27 having radially extending pairs of ribs 28 formed on its forward face. The ribs 28 are apertured to receive the pins 29 for connecting the links 26 to the piston. A cupped leather packing ring 30 is secured to the rear face of the piston to insure a tight seal between the piston and the walls of the cylinders.

The wall of the inner cylinder 3 defines an axially extending passage 31 which extends from the rear end of the cylinder to adjacent the pinion spider at the forward end thereof. A radially extending bore 32 connects the passage 31 with the annular space between the cylinders. A radial bore 33 in the outer cylinder aligned with the bore 32 and closed by a suitable plug permits access of a boring tool to the hole 32 and forms a bleed passage for the space within the annular cylinder. A second axial bore 34 in the opposite side of the inner cylinder 2 connects by means of a radial passage 35 with the annular space between the cylinders and on the opposite side of the piston from the passage 32.

Figure 6:
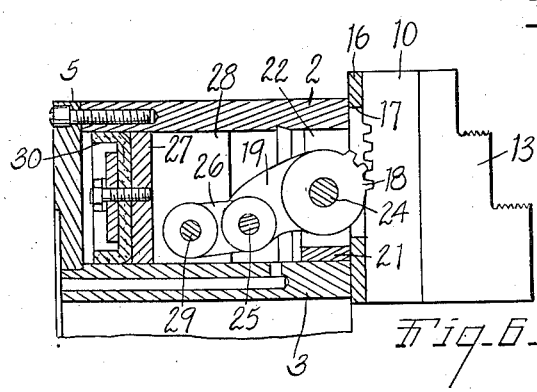
Fig. 6 is a fragmentary cross sectional view similar to Fig. 1 but showing the chuck in open position.

Our chuck is designed to be mounted on a lathe having a mandrel or face plate 36 as shown in dotted lines in Fig. 1 and provided with a suitable fixed distributor and gland with connections 37 and passages for supplying fluid, such as oil or air, under pressure selectively to the passages 31 and 34. When fluid is admitted to the passage 31, it travels through the hole 32 and forces the piston away from the face of the chuck, drawing the link 26 with it until the link 26 and pinion lever 19 assume the position shown in Fig. 6. Rotation of the pinion lever causes the pinion teeth to move the rack teeth 14 and the jaw slide radially upwardly to open the jaws of the chuck. Releasing the pressure in passage 31 and applying it to passage 34, exerts pressure of the rear face of the piston and moves it forwardly to raise the free end of the pinion lever and rotate the pinion teeth inwardly and close the jaws of the chuck as shown in Fig. 1. The details of construction of the face plate and the hydraulic supply line do not form a part of this invention and so are not shown in greater detail.

From the above description it should be apparent that our chuck operates to supply positive opening and closing pressure so that it may be used either as an external or internal chuck and that it may be mounted on any machine capable of having a face plate installed thereon which will supply two fluid pressure lines at its surface. The entire actuating mechanism for the chuck is combined in the one body member and it is not necessary to have an actuating rod extending through the head shaft and mandrel of the lathe. We have shown our chuck as provided with six jaws, but obviously, the number of jaws and other details of construction may be changed or reproduced by persons skilled in the art.

Having thus described our invention, what we claim as new and desire to secure by Letters Patent, is:

1. A hydraulic chuck comprising a body member having inner and outer cylindrical portions joined together at their ends in spaced relationship by front and rear end plates, said front plate being cut away in a series of radially extending slots, said slots being under-cut or widened at their inner edges, a pair of shoe slide members positioned in each of said slots and having notched outer edges engaging the undercut portions of said slots, a jaw slide member positioned between each of said pairs of shoe slides and having rack teeth formed on the rear faces thereof, shoe plates secured to the back of each jaw slide and connected to the backs of the shoe slides associated therewith, said shoe plates defining apertures exposing said rack teeth, a spider member mounted between said cylindrical portions and adjacent said shoe plates, pinion levers pivoted on said spider and having teeth engaged with said rack teeth, an annular piston positioned between said cylindrical portions, links pivotally connected between said piston and said pinion levers whereby axial movement of said piston causes radial movement of said jaw slides, said inner cylindrical member defining passages whereby fluid under pressure may be admitted to either side of said piston, and jaw members secured to said jaw slides.

2. A hydraulic chuck adapted to be mounted on a machine and comprising a body member having inner and outer cylindrical portions joined together at their forward ends in spaced relationship by a front plate, said plate being cut away in a plurality of radially extending slots, said slots being undercut on the rear edges thereof, a pinion supporting spider positioned between said cylindrical portions and having pinion levers pivotally mounted thereon opposite each of said slots, an annular piston arranged to slide between said cylindrical portions and having ribs formed on the forward face thereof, pivot pins supported by said ribs, link members pivoted on said pins and connected to the ends of said pinion levers, jaw slides positioned in said slots and having rack teeth formed on the rear faces thereof cooperable with said pinion levers and a plurality of jaw members secured to said jaw slides, said inner cylindrical portion defining passages communicating with the annular space betweeen said cylindrical portions whereby fluid under pressure may be admitted to either side of said piston.

3. A hydraulic chuck comprising a body member having inner and outer cylindrical portions joined together at their ends in spaced relationship by end plates, the front plate being cut away in a plurality of radially extending slots, said slots being undercut on the inner edges thereof, a pinion supporting spider positioned between said cylindrical portions and having a plurality of pinion levers pivotally mounted thereon, an annular piston arranged to slide between said cylindrical portions and having ribs formed on the forward face thereof, link members pivoted on said ribs and connected to the ends of said pinion levers, jaw slides positioned in said slots and having rack teeth formed on the rear faces thereof cooperable with said pinion levers and a plurality of jaw members secured to said jaw slides, one of said cylindrical portions defining passages communicating with the annular space between said cylindrical portions whereby fluid under pressure may be admitted to either side of said piston.

4. A hydraulic chuck comprising a body member having inner and outer cylindrical portions joined together at their ends in spaced relationship by end plates, the front plate being cut away in a plurality of radially extending slots, a pinion supporting spider positioned between said cylindrical portions and having a plurality of pinion levers pivotally mounted thereon, an annular piston arranged to slide between said cylindrical portions, link members pivoted on the front of said piston and connected to the ends of said pinion levers, jaw members positioned in said slots and having rack teeth formed on the rear faces thereof cooperable with said pinion levers, one of said cylindrical portions defining passages communicating with the annular space between said cylinders, whereby fluid under pressure may be admitted to either side of said piston.

5. A hydraulic chuck comprising a body member having coextensive inner and outer cylindrical portions joined together by a face plate, said plate defining a plurality of radially extending slots, means slidably supporting jaw members in said slots and defining rack teeth on the rear face thereof, an annular piston slidably within the space between said cylindrical portions and means including a pinion positioned in the space between said cylindrical portions and engageable with said rack teeth and connected to said piston whereby axial movement of said piston will cause radial movement of said jaws, said body member defining a passage whereby fluid under pressure may be admitted to a face of said piston.

6. A hydraulic chuck comprising a body member having inner and outer cylindrical portions joined together by a face plate, said plate defining a plurality of radially extending slots, means slidably supporting jaw members in said slots and defining rack teeth on the rear face thereof, an annular piston slidably within the space between said cylindrical portions and means including a pinion positioned in the space between said cylindrical portions and engageable with said rack teeth and connected to said piston whereby axial movement of said piston will cause radial movement of said jaws, said body member having passages formed therein for admitting fluid under pressure to either side of said piston.

7. A hydraulic chuck comprising a body member defining an annular cylinder and provided with a plurality of radial jaw slide ways opening to said cylinder, jaws slidably mounted in said ways and provided with racks on their inner sides, pinions co-acting with said racks, a pinion supporting spider for said pinions mounted within said cylinder, an annular piston of the same annular dimension as said spider positioned in said cylinder said pinions being operatively connected to said piston for simultaneous actuation thereby, and means for supplying actuating fluid to advance or retract said piston.

WILLIAM J. A. McKAY.
ARTHUR J. KOON.

REFERENCES CITED

The following references are of record in the file of this patent:

UNITED STATES PATENTS

| Number | Name | Date |
|---|---|---|
| 1,406,451 | Elvers | Feb. 14, 1922 |
| 1,424,889 | Finlayson | Aug. 8, 1922 |
| 1,613,090 | Fornaca | Jan. 4, 1927 |
| 1,925,109 | Olson | Sept. 5, 1933 |
| 1,968,700 | Milotta | July 31, 1934 |